US012695363B2

(12) United States Patent
Hubert et al.

(10) Patent No.: US 12,695,363 B2
(45) Date of Patent: Jul. 28, 2026

(54) INTERNALLY SHUNTING GROUNDING BRUSH ASSEMBLY WITH AXIAL BRUSHES AND CENTERING BEARINGS

(71) Applicant: AKTIEBOLAGET SKF, Gothenburg (SE)

(72) Inventors: Mathieu Hubert, Ann Arbor, MI (US); Gene Arthur Kovacs, Brighton, MI (US); David Christopher Rybski, White Lake, MI (US); Alberto Carlevaris, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 167 days.

(21) Appl. No.: 18/925,371

(22) Filed: Oct. 24, 2024

(65) Prior Publication Data

US 2026/0018977 A1     Jan. 15, 2026

(30) Foreign Application Priority Data

Jul. 11, 2024     (IT) ........................ 102024000016090

(51) Int. Cl.
    *H02K 11/40*     (2016.01)
    *H01R 39/24*     (2006.01)

(52) U.S. Cl.
    CPC ............. *H02K 11/40* (2016.01); *H01R 39/24* (2013.01)

(58) Field of Classification Search
    CPC ........ H01R 39/24; H02K 11/40; H02K 11/00; H02K 11/30; H02K 11/38; Y10T 29/53709
    See application file for complete search history.

(56) References Cited

U.S. PATENT DOCUMENTS

| | | | |
|---|---|---|---|
| 2019/0296617 A1* | 9/2019 | Hubert .................. | H01R 39/64 |
| 2022/0255407 A1 | 8/2022 | Chen et al. | |

(Continued)

FOREIGN PATENT DOCUMENTS

| | | |
|---|---|---|
| CN | 214543908 U | 10/2021 |
| CN | 113949218 A | 1/2022 |

(Continued)

OTHER PUBLICATIONS

CN-113949221-A, all pages (Year: 2021).*

(Continued)

*Primary Examiner* — Naishadh N Desai
(74) *Attorney, Agent, or Firm* — J-TEK LAW PLLC; Scott T. Wakeman; Mark A. Ussai

(57) ABSTRACT

A grounding brush assembly is for an electric machine include a rotatable shaft having a bore, an outer housing, bearing(s) rotatably coupling the shaft and housing and an electrically-grounded, fixed shaft extending through the rotatable shaft bore. A conductive base member receives the fixed shaft and has a main body portion and at least one end body portion with an outside diameter less than the main body portion outside diameter. A centering bearing is disposed about the end body portion. A conductive brush coupled with the main body portion includes conductive fibers extending radially outwardly from the main body portion and axially along a centerline. Each conductive fiber has an inner radial end coupled with the base member and an outer radial end engageable with the inner circumferential surface of the rotatable shaft such that at least one conductive path extends from the rotatable shaft to the fixed shaft.

13 Claims, 4 Drawing Sheets

(56)     References Cited

U.S. PATENT DOCUMENTS

| | | |
|---|---|---|
| 2022/0294319 A1 | 9/2022 | Arnault et al. |
| 2024/0055959 A1 | 2/2024 | Zhou et al. |
| 2024/0128839 A1 | 4/2024 | Kim |

FOREIGN PATENT DOCUMENTS

| | | | | |
|---|---|---|---|---|
| CN | 113949221 A | * | 1/2022 | ............ H02K 5/163 |
| CN | 217282471 U | | 8/2022 | |
| CN | 115940524 A | | 4/2023 | |
| DE | 102019202844 A1 | | 9/2019 | |
| DE | 102022202004 A1 | | 9/2022 | |
| DE | 102023100970 A1 | | 2/2024 | |
| JP | 2016119760 A | | 6/2016 | |
| WO | 2018196924 A1 | | 11/2018 | |

OTHER PUBLICATIONS

Unpublished U.S. Appl. No. 18/925,344, first named inventor: Mathieu Hubert, filed Oct. 24, 2024.
Unpublished U.S. Appl. No. 18/925,359, first named inventor: Mathieu Hubert, filed Oct. 24, 2024.
Written Opinion and Search Report from the Italian Patent Office mailed Jan. 15, 2025 in related application No. IT 102024000016090.
Unpublished U.S. Appl. No. 18/925,378, first named inventor: Mathieu Hubert, filed Oct. 24, 2024.

\* cited by examiner

INTERNALLY SHUNTING GROUNDING BRUSH ASSEMBLY WITH AXIAL BRUSHES AND CENTERING BEARINGS

CROSS-REFERENCE

This application claims priority to Italian patent application no. 102024000016090 filed on Jul. 11, 2024, the contents of which are fully incorporated herein by reference.

BACKGROUND OF THE INVENTION

The present invention relates to grounding devices for bearings, and more particularly to grounding brush assemblies for shunting current away from bearings.

In electric machines, such as an electric motor, a generator, etc., the machine typically includes a shaft rotatable about a central axis, an outer housing and at least one bearing connecting the shaft to a housing. Such bearings generally include an inner ring mounted on the rotatable shaft, an outer ring disposed about the inner ring and engaged with the housing, and a plurality of rolling elements disposed between the inner and outer rings. During operation, electric charge may accumulate on the shaft, which can generate an electric current that passes from the shaft, through the bearing and into the outer housing. These currents can cause damage to the raceways of the inner and outer rings as well as to the rolling elements.

In order to avoid damage to the bearings, it is known to provide a grounding brush assembly that provides a conductive path between the shaft and the housing in order to shunt current away from the bearing(s). Such a grounding brush assembly typically includes a bracket or holder connected with the housing and a brush attached to the bracket/holder and including a plurality of conductive fibers extending radially inwardly from the holder and contacting the outer surface of the shaft, or a sleeve or other member mounted on the shaft. Alternatively, the holder may be mounted on the shaft and have a plurality of radially-outwardly directed fibers engaged with an inner circumferential surface of the housing.

SUMMARY OF THE INVENTION

In one aspect, the present invention is a grounding brush assembly for an electric machine, the electric machine including a rotatable shaft rotatable about a central axis and having an inner circumferential surface defining a hollow bore, an outer housing, at least one bearing rotatably coupling the shaft with the housing, and a fixed shaft extending through the bore of the rotatable shaft and being electrically grounded. The grounding brush assembly comprises a conductive base member including a cylindrical body with a bore sized to receive a portion of the fixed shaft and a centerline coaxially alignable with the central axis, the cylindrical body having a main body portion with an outer circumferential surface and a first outside diameter and at least one end body portion with a second outside diameter, the second outside diameter having a value less than a value of the first outside diameter. At least one centering bearing includes an inner ring disposed about the at least one end body portion of the cylindrical body of the base member and an outer ring engageable with the inner circumferential surface of the rotatable shaft so as to center the rotatable shaft about the fixed shaft. At least one conductive brush is coupled with the conductive base member and includes a plurality of conductive fibers extending radially outwardly from the outer surface of the main body portion of the base member and axially along the centerline, each conductive fiber having an inner radial end coupled with the base member and an outer radial end engageable with the inner circumferential surface of the rotatable shaft such that at least one conductive path extends from the rotatable shaft, through the brush and the base member, and to the fixed shaft.

Preferably, the main body portion of the cylindrical body has a first axial end and an opposing second axial end and the at least one end body portion of the cylindrical body includes a first end body portion extending axially from the first axial end of the main body portion and a second end body portion extending axially from the second axial end of the main body portion. With this structure, the at least one centering bearing includes a first centering bearing disposed about the first end body portion of the cylindrical body of the base member and a second centering bearing disposed about the second end body portion of the cylindrical body of the base member.

Further, the main body portion of the cylindrical body of the base member preferably has at least one axial groove extending radially inwardly from the outer circumferential surface of the main body portion and axially between the first and second axial ends of the main body portion, the inner end of each one of the plurality of conductive fibers being disposed within the at least one axial groove and the plurality of conductive fibers being spaced axially along the at least one axial groove. Preferably, the at least one conductive brush includes a plurality of conductive brushes, each one of the plurality of brushes being disposed within a separate one of a plurality of axial grooves of the main body portion of the cylindrical body.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
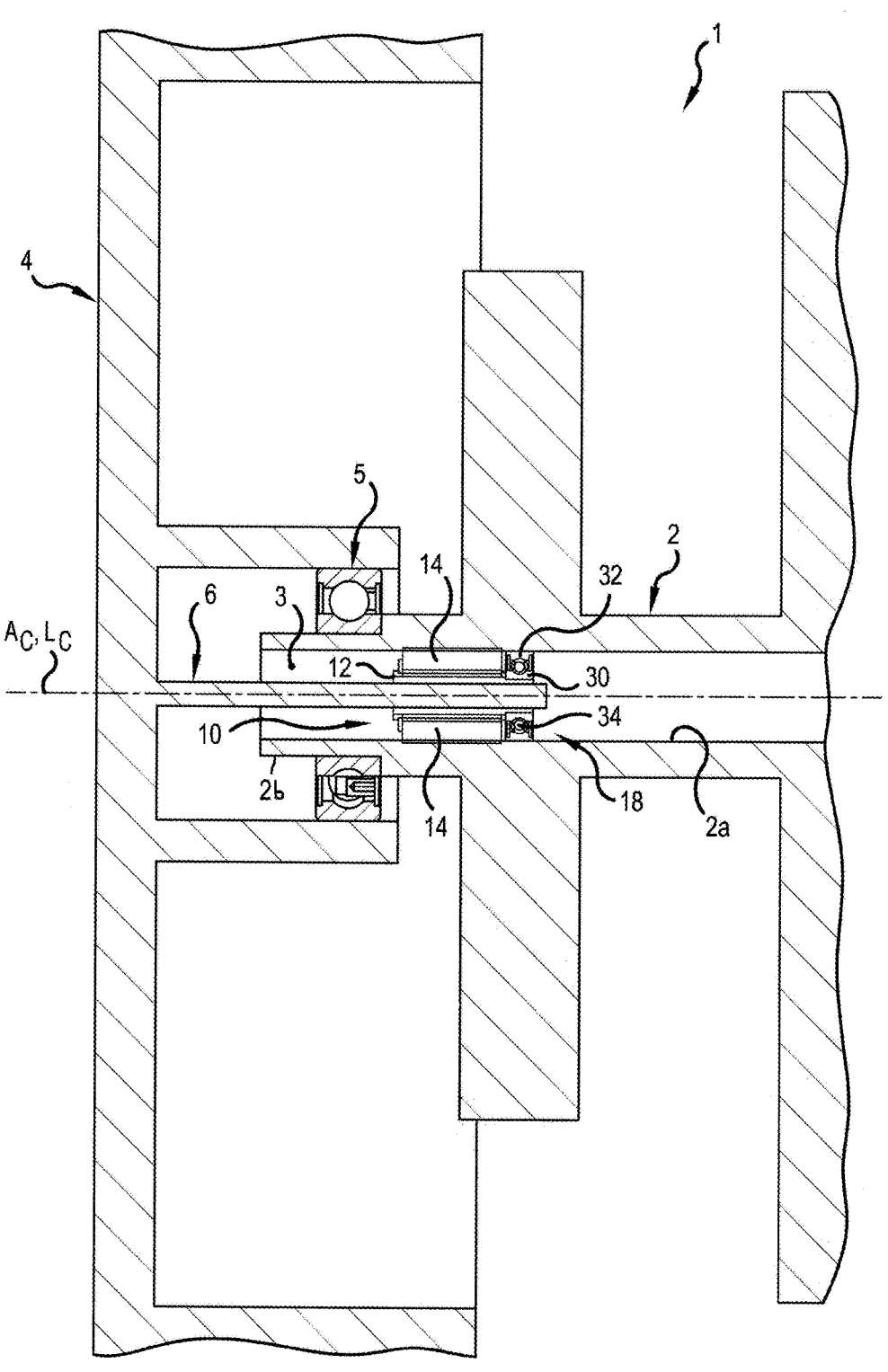
FIG. 1 is an axial cross-sectional view of an electric machine including a grounding brush assembly in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-4 a grounding brush assembly 10 for an electric machine 1. The electric machine 1 includes a shaft 2 rotatable about a central axis $A_C$ and having an inner circumferential surface 2a defining a hollow bore 3, an outer housing 4, at least one bearing 5 rotatably coupling the shaft 2 with the housing 4, and a fixed shaft 6 extending through the bore 3 of the rotatable shaft 2 and being electrically grounded. The grounding brush assembly 10 basically comprises a conductive base member 12, at least one conductive brush 14 coupled with the base member 12 and having a plurality of conductive fibers 40, and at least one centering bearing 18 disposed about an end portion 28 of the base member 12.

Figure 2:
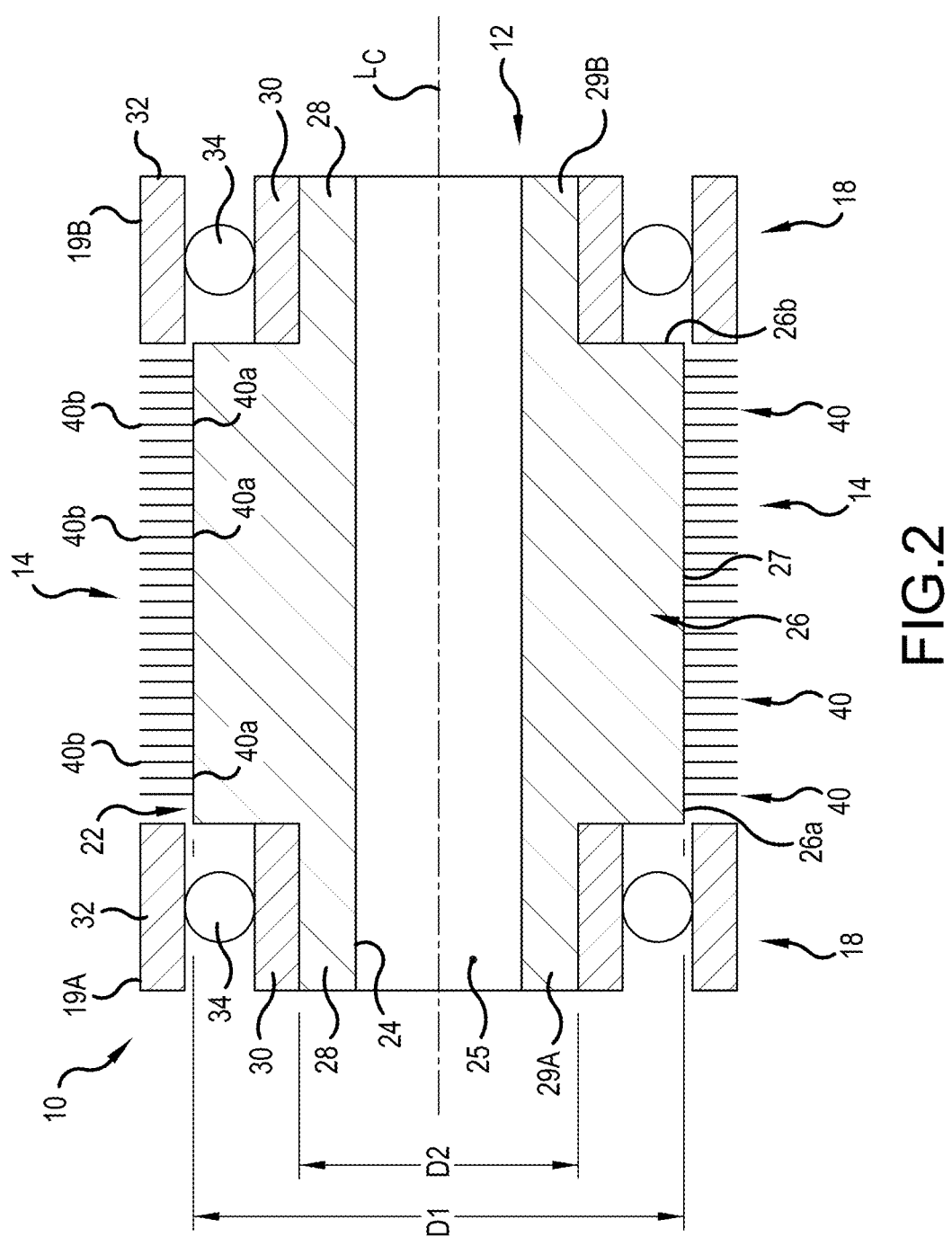
FIG. 2 is an axial cross-sectional view of a grounding brush assembly with a base member having two end body portions and two centering bearings.

More specifically, the base member 12 includes a cylindrical body 22 having an inner circumferential surface 24 defining a bore 25 sized to receive a portion of the fixed shaft 6 and a centerline $L_C$ coaxially alignable with the central axis $A_C$. Preferably, the grounding brush assembly 10 is mounted to the fixed shaft 6 by a friction fit between the inner surface 24 of the cylindrical body 22 and the outer circumferential surface (not indicated) of the shaft 6. Further, the cylindrical body 22 includes a main body portion 26 with an outer circumferential surface 27 and a first outside diameter D1 and at least one end body portion 28 with a second outside diameter D2, the second outside diameter D2 having a value less than a value of the first outside diameter D1, as indicated in FIG. 2. As such, the at least one end body portion 28 is inwardly stepped with respect to the main body portion 26. Furthermore, the cylindrical body 22 is formed of an electrically conductive material, such as steel, aluminum, a conductive polymer or any other appropriate conductive material.

The at least one centering bearing 18 includes an inner ring 30 disposed about the at least one end body portion 28 of the cylindrical body 22 of the base member 12 and an outer ring 32 engageable with the inner circumferential surface 2a of the rotatable shaft 2, and preferably includes a plurality of rolling elements 34 disposed between the inner and outer rings 30, 32. The at least one centering bearing 18 functions to couple the rotatable shaft 2 with the fixed shaft 6, such that the centering bearing(s) 18 stiffen and prevent vibration of the fixed shaft 6, and are not provided to support loading between the two shafts 2, 6.

Further, the at least one conductive brush 14 includes a plurality of conductive fibers 40 extending radially outwardly from the outer surface 27 of the main body portion 26 of the base member 12 and axially along the centerline $L_C$, and may alternatively extend both axially along and circumferentially about the centerline $L_C$. Each conductive fiber 40 has an inner radial end 40a coupled with the main body portion 26 of the base member 12 and an outer radial end 40b engageable with the inner circumferential surface 2a of the rotatable shaft 2.

As such, at least one electrically conductive path extends from the rotatable shaft 2, through the brush 14 and the base member 12, and to the fixed shaft 6. With the present grounding brush assembly 10, any charge accumulating on the rotatable shaft 2 flows as a current through the assembly 10 rather than passing through the bearing(s) 5 of the electric machine 1. Thereby, damage to the rolling elements and raceways (neither indicated) of the bearing(s) 5 is avoided while the centering bearing(s) 18 stiffen and prevent vibration of the fixed shaft 6. Having described the basic elements and functions above, these and other components of the present grounding brush assembly 10 are described in further detail below.

Figure 3:
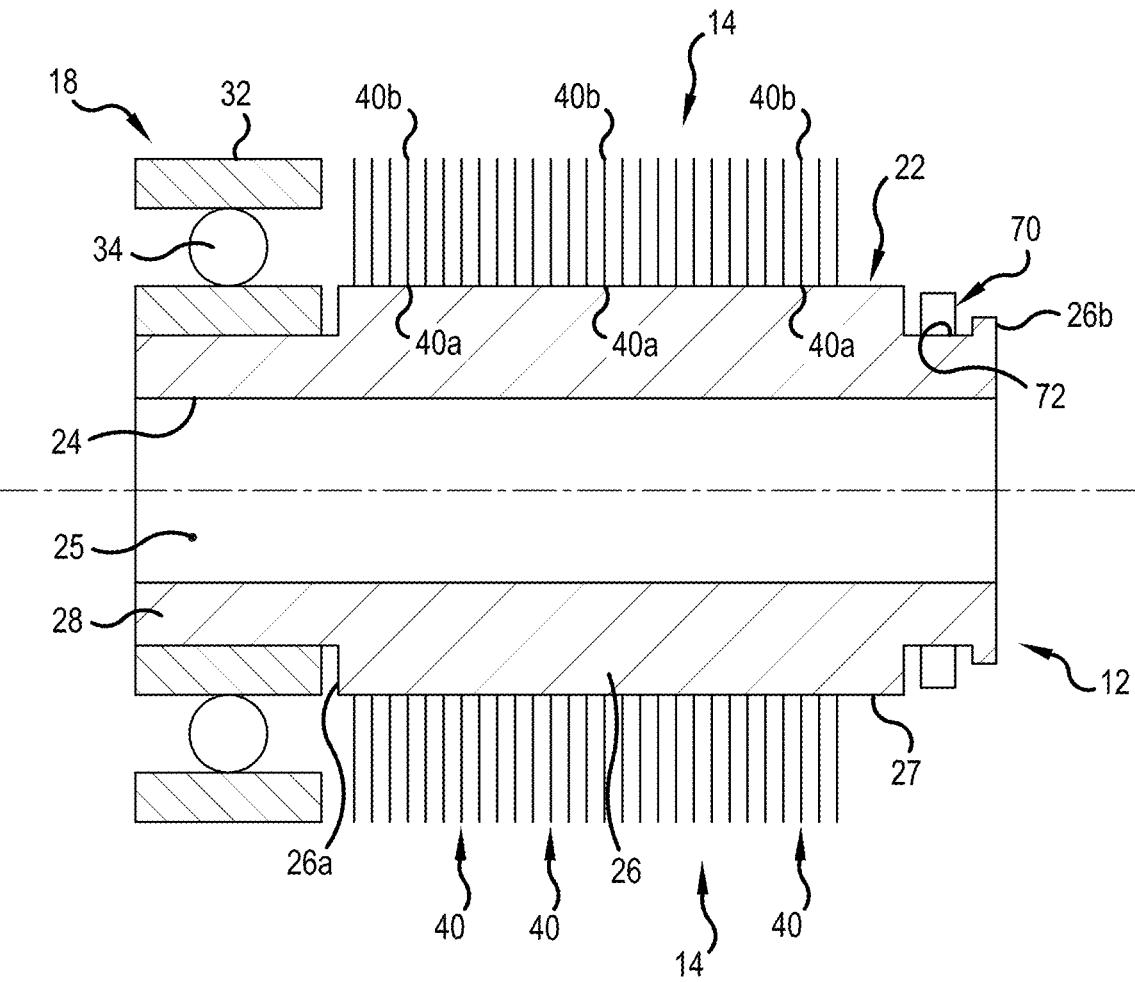
FIG. 3 is an axial cross-sectional view of a grounding brush assembly with a base member having a single end body portion and one centering bearing.
Figure 4:
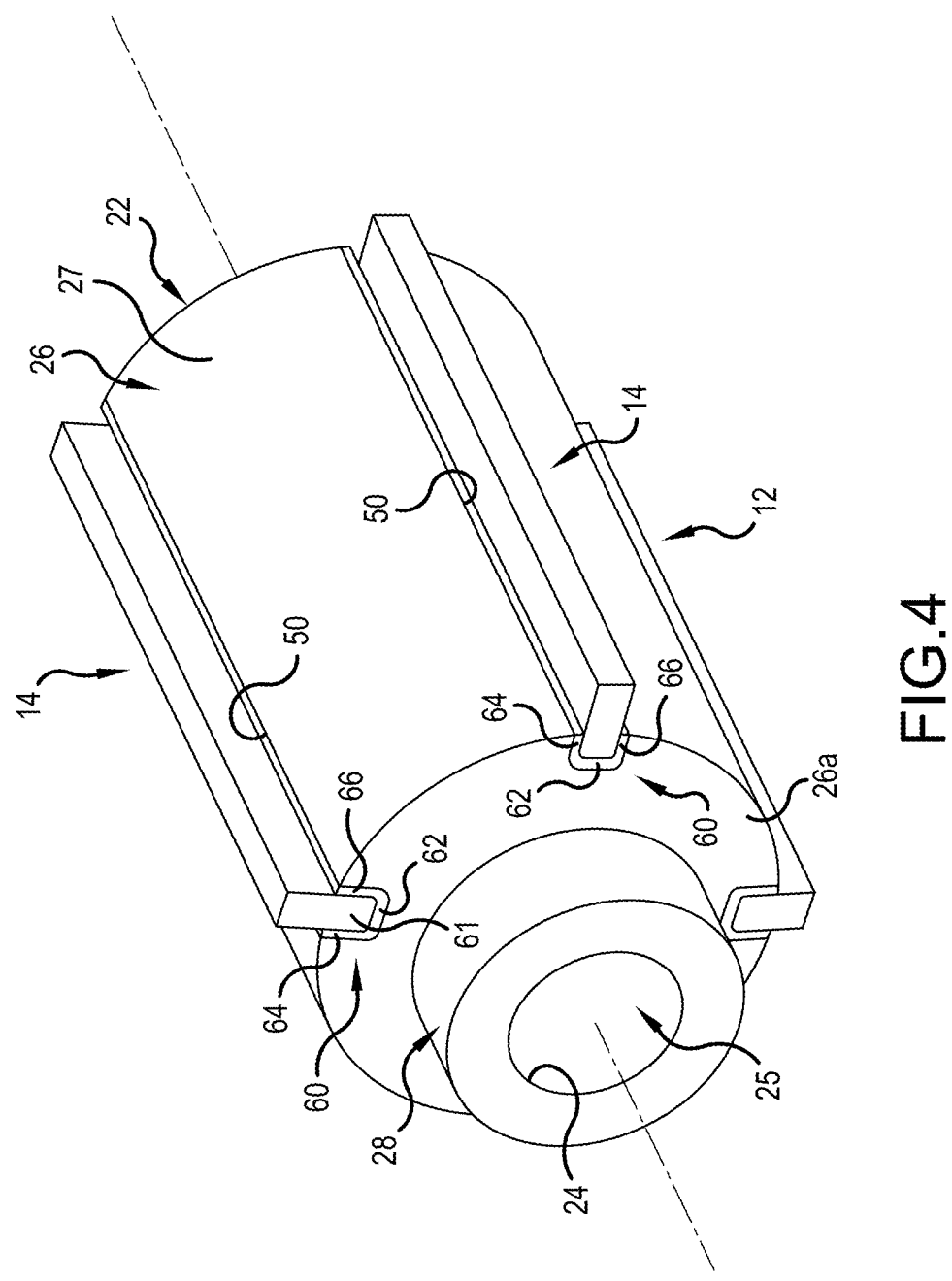
FIG. 4 is a perspective view of a base member with a single end body portion.

Referring to FIGS. 2-4, the main body portion 26 has a first axial end 26a and an opposing second axial end 26b and preferably includes at least one axial groove 50 extending radially inwardly from the outer surface 27 of the main body portion 26. The at least one groove 50 extends axially between the first and second axial ends 26a, 26b of the main body portion 26. Further, the inner end 40a of each one of the plurality of conductive fibers 40 is disposed within the at least one axial groove 50 and the plurality of conductive fibers 40 are spaced along the at least one axial groove 40. Preferably, the at least one axial groove 50 includes a plurality of axial grooves 50 each extending axially between the first and second ends 26a, 26b of the main body portion 26 and spaced circumferentially apart about the centerline $L_C$. Alternatively, the main body portion 26 may include only a single spiral groove (not depicted) formed in the outer surface 27 of the main body portion 26 and extending axially between the first and second axial ends 26a, 26b and circumferentially about the centerline $L_C$.

As depicted in FIG. 2, the cylindrical body 22 preferably includes two end body portions 28, specifically a first end body portion 29A extending axially from the first axial end 26a of the main body portion 26a and a second end body portion 29B extending axially from the second axial end 26b of the main body portion 26. With this body structure, the at least one centering bearing 18 includes a first centering bearing 19A disposed about the first end body portion 29A of the cylindrical body 22 and a second centering bearing 19B disposed about the second end body portion 19A of the cylindrical body 22.

Referring particularly to FIG. 4, the at least one conductive brush 14 preferably includes a plurality of conductive brushes 14, each one of the plurality of brushes 14 being disposed within a separate one of the axial grooves 50 of the main body portion 26 of the cylindrical body 22. Each brush 14 preferably includes a retainer 60 with a base wall 62 and two spaced apart side walls 64, 66 extending from the base wall 62 so as to define an axial channel 61. The plurality of conductive fibers 40 of each brush 14 are disposed between and engaged by the two side walls 64, 66 so as to retain the conductive fibers 40 within the axial channel 41. Preferably, the retainer 40 is formed of an electrically conductive material, such as steel, aluminum, a conductive polymer, etc., and each conductive fiber 40 is a strand of an electrically conductive material, preferably carbon but may be formed of steel, aluminum, a conductive polymer, etc.

In the preferred cylindrical body 22 having two end body portions 29A, 29B and two centering bearings 19A, 19B, each brush 14 is retained within the associated axial groove 50 of the main body portion 26 by the two bearings 19A, 19B. However, as depicted in FIG. 3, the cylindrical body 22 may be formed with only a single end body portion 28 extending from the first axial end 26a of the main body portion 26, in which case the conductive base member 12 further includes an annular retainer clip 70 engaged with the second axial end 26b of the main body portion 26. The retainer clip 70 is configured to retain each brush 14 disposed within the associated axial groove 50 of the main body portion 26 of the cylindrical body 22. Preferably, the cylindrical body 22 has an annular groove 72 located adjacent to second axial end 26*b* of the main body portion 26 and the retainer clip 70 is a C-clip disposed within the annular groove 72 and disposed against an axial end (not indicated) of each brush 14.

With the grounding brush assembly 10 of the present invention, the conductive fibers 40 contact the inner surface 2*a* of the rotating shaft 2, which has a linear velocity (i.e., tangent to the surface 2*a*) with a magnitude that is less than the magnitude of the linear velocity at the outer surface 2*b* of the shaft 2. As such, both friction and wear of the conductive fibers 40 is reduced in comparison with known grounding brush assemblies having conductive fibers contacting an outer surface of a rotating shaft.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly for an electric machine, the electric machine including a rotatable shaft rotatable about a central axis and having an inner circumferential surface defining a hollow bore, an outer housing, at least one bearing rotatably coupling the shaft with the housing, and a fixed shaft extending through the bore of the rotatable shaft and being electrically grounded, the grounding brush assembly comprising:

a conductive base member including a cylindrical body with a bore sized to receive a portion of the fixed shaft and a centerline coaxially alignable with the central axis, the cylindrical body having a main body portion with an outer circumferential surface and a first outside diameter and at least one end body portion with a second outside diameter, the second outside diameter having a value less than a value of the first outside diameter;

at least one centering bearing including an inner ring disposed about the at least one end body portion of the cylindrical body of the base member and an outer ring engageable with the inner circumferential surface of the rotatable shaft so as to center the rotatable shaft about the fixed shaft; and at least one conductive brush coupled with the conductive base member and including a plurality of conductive fibers extending radially outwardly from the outer surface of the main body portion of the base member and axially along the centerline, each conductive fiber having an inner radial end coupled with the base member and an outer radial end engageable with the inner circumferential surface of the rotatable shaft such that at least one conductive path extends from the rotatable shaft, through the brush and the base member, and to the fixed shaft.

2. The grounding brush assembly as recited in claim 1, wherein:

the main body portion of the cylindrical body has a first axial end and an opposing second axial end and the at least one end body portion of the cylindrical body includes a first end body portion extending axially from the first axial end of the main body portion and a second end body portion extending axially from the second axial end of the main body portion; and the at least one centering bearing includes a first centering bearing disposed about the first end body portion of the cylindrical body of the base member and a second centering bearing disposed about the second end body portion of the cylindrical body of the base member.

3. The grounding brush assembly as recited in claim 1, wherein the main body portion of the cylindrical body of the base member has at least one axial groove extending radially inwardly from the outer circumferential surface of the main body portion and axially between the first and second axial ends of the main body portion, the inner end of each one of the plurality of conductive fibers being disposed within the at least one axial groove and the plurality of conductive fibers being spaced axially along the at least one axial groove.

4. The grounding brush assembly as recited in claim 3, wherein:

the at least one axial groove of the main body portion of the cylindrical body includes a plurality of axial grooves each extending axially between the first and second ends of the main body portion and spaced circumferentially apart about the centerline of the base member; and the at least one conductive brush includes a plurality of conductive brushes, each one of the plurality of brushes being disposed within a separate one of the axial grooves of the main body portion of the cylindrical body.

5. The grounding brush assembly as recited in claim 3, wherein the at least one conductive brush includes a retainer with a base wall and two spaced apart side walls extending from the base wall so as to define an axial channel, the plurality of conductive fibers being disposed between and engaged by the two side walls so as to retain the conductive fibers within the axial channel.

6. The grounding brush assembly as recited in claim 3, wherein:

the main body portion of the cylindrical body of the conductive base member has a first axial end and an opposing second axial end, the at least one end body portion extending axially from the first axial end; and the conductive base member further includes a retainer clip engaged with the second axial end of the main body portion and configured to retain the at least one conductive brush disposed within the axial groove of the main body portion of the cylindrical body.

7. The grounding brush assembly as recited in claim 6, wherein the cylindrical body has an annular groove located adjacent to the second axial end of the main body portion and the retainer clip is a C-clip disposed within the annular groove and disposable against an axial end of the at least one conductive brush.

8. A grounding brush assembly for an electric machine, the electric machine including a rotatable shaft rotatable about a central axis and having an inner circumferential surface defining a hollow bore, an outer housing, at least one bearing rotatably coupling the shaft with the housing, and a fixed shaft extending through the bore of the rotatable shaft and being electrically grounded, the grounding brush assembly comprising:

a conductive base member including a cylindrical body with a bore sized to receive a portion of the fixed shaft and a centerline coaxially alignable with the central axis, the cylindrical body having a main body portion with an outer circumferential surface and a first outside diameter and at least one end body portion with a second outside diameter, the second outside diameter having a value less than a value of the first outside diameter;

at least one centering bearing including an inner ring disposed about the at least one end body portion of the cylindrical body of the base member and an outer ring engageable with the inner circumferential surface of the rotatable shaft so as to center the rotatable shaft about the fixed shaft; and a plurality of conductive brushes each coupled with the main body portion of the conductive base member and spaced circumferentially apart about the centerline, each one of the plurality of conductive brushes including a plurality of conductive fibers extending radially outwardly from the outer surface of the main body portion of the base member and axially along the centerline, each conductive fiber having an inner radial end coupled with the cylindrical body of the base member and an outer radial end engageable with the inner circumferential surface of the rotatable shaft such that at least one conductive path extends from the rotatable shaft, through each one the plurality of brushes and the base member, and to the fixed shaft.

9. The grounding brush assembly as recited in claim 8, wherein:

the main body portion of the cylindrical body has a first axial end and an opposing second axial end and the at least one end body portion of the cylindrical body includes a first end body portion extending axially from the first axial end of the main body portion and a second end body portion extending axially from the second axial end of the main body portion; and the at least one centering bearing includes a first centering bearing disposed about the first end body portion of the cylindrical body of the base member and a second centering bearing disposed about the second end body portion of the cylindrical body of the base member.

10. The grounding brush assembly as recited in claim 8, wherein the main body portion of the cylindrical body of the base member has a plurality of axial grooves spaced circumferentially about the centerline, each axial groove extending radially inwardly from the outer circumferential surface of the main body portion and axially between the first and second axial ends of the main body portion, the inner radial ends of the plurality of conductive fibers of each one of the plurality of brushes being disposed within and spaced axially along a separate one of the axial grooves.

11. The grounding brush assembly as recited in claim 8, wherein each one of the plurality of conductive brushes includes a retainer with a base wall and two spaced apart side walls extending from the base wall so as to define an axial channel, the plurality of conductive fibers being disposed between and engaged by the two side walls so as to retain the conductive fibers within the axial channel.

12. The grounding brush assembly as recited in claim 8, wherein:

the main body portion of the cylindrical body of the conductive base member has a first axial end and an opposing second axial end, the at least one end body portion extending axially from the first axial end; and the conductive base member further includes a retainer clip engaged with the second axial end of the main body portion and configured to retain the at least one conductive brush disposed within the axial groove of the main body portion of the cylindrical body.

13. The grounding brush assembly as recited in claim 12, wherein the cylindrical body has an annular groove located adjacent to the second axial end of the main body portion and the retainer clip is a C-clip disposed within the annular groove and disposable against an axial end of the at least one conductive brush.

\* \* \* \* \*